United States Patent Office.

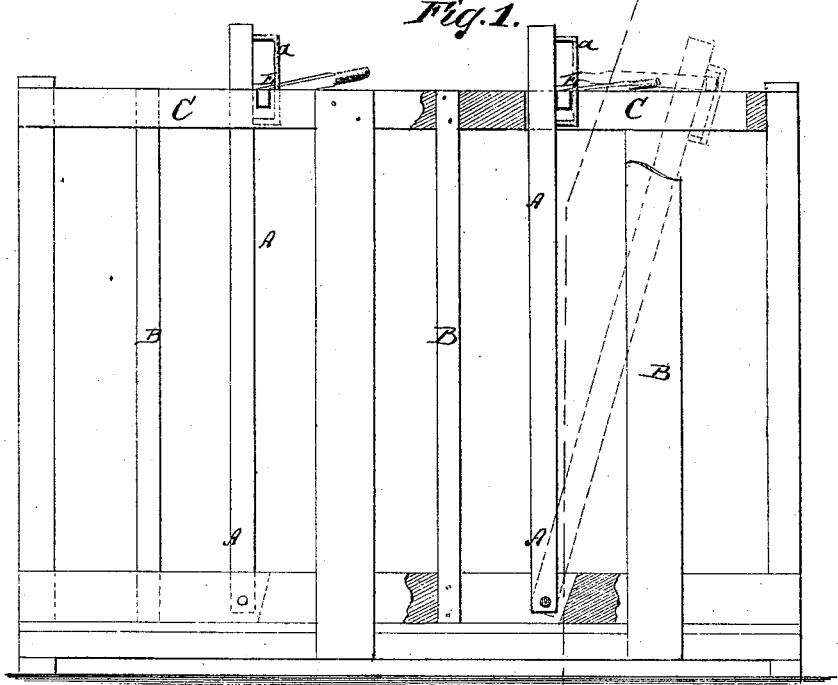
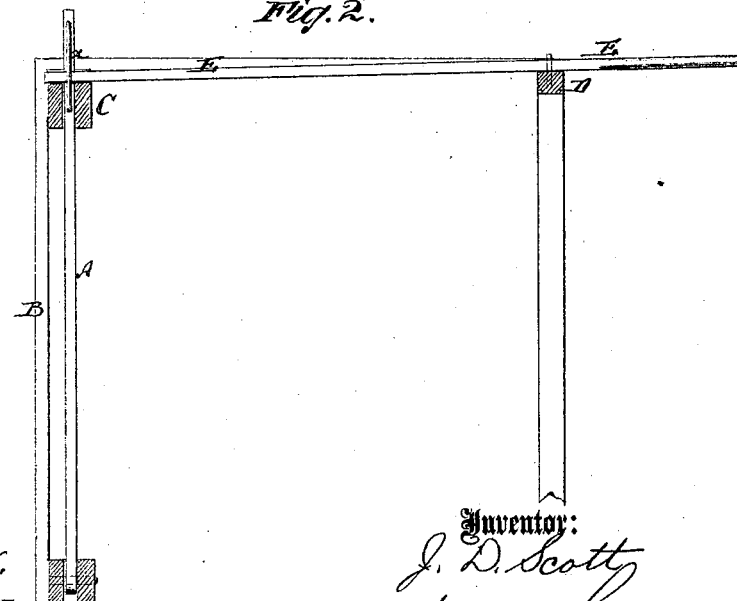

JOHN D. SCOTT, OF ALVISO, CALIFORNIA.

Letters Patent No. 106,876, dated August 30, 1870.

IMPROVEMENT IN CATTLE-STANCHIONS.

The Schedule referred to in these Letters Patent and making part of the same

*To all whom it may concern:*

Be it known that I, JOHN D. SCOTT, of Alviso, in the county of Santa Clara and State of California, have invented a new and improved Cattle-Stanchion; and I do hereby declare that the following is a full, clear, and exact description thereof, which will enable others skilled in the art to make and use the same, reference being had to the accompanying drawing forming part of this specification, in which—

Figure 1 represents a side elevation, partly in section, of my improved cattle-stanchion.

Figure 2 is a vertical longitudinal section of the same.

Similar letters of reference indicate corresponding parts.

The object of this invention is to provide a simple and efficient device for operating and fastening the pivoted stanchions by which horned cattle are confined to their stalls.

The invention consists in the combination of a self-locking lever with each pivoted stanchion, the lever dropping by its own weight into a groove or notch of a transverse beam, to thereby lock the stanchion in its vertical position. By a slight motion of the lever the stanchion can be swung aside.

The lever extends backward, to be reached without stepping to the side of the animal, and the difficulties hitherto connected with the fastening or unfastening of the animal are therefore entirely overcome, besides allowing their being placed closer together.

A, in the drawing, is a pivoted stanchion, of suitable kind, arranged in the front part of a stall between a series of fixed posts, B B.

The upper end of the stanchion fits through a slotted main timber, C, and is guided in the same.

To a stringer, D, which runs across the back part of the stall on a level with C, is pivoted a lever, E, whose front end fits through a vertical slot of the stanchion, or through a vertical loop, *a*, formed on said stanchion.

The rear end of the lever E forms a short handle projecting beyond the stringer.

When the stanchion is in the vertical position for holding the cattle, the front end of the lever E drops by its own weight into a notch or groove provided in the timber C, and serves thereby to lock the stanchion. A slight pressure upon the rear end of the lever will lift it out of said notch to permit the swinging aside of the stanchion.

I do not claim the stanchion, nor the manner of pivoting the same; nor do I confine myself to the use of the groove or notch in the timber C, the same being applicable to any other timber placed near C.

Having thus described my invention,

What I claim as new, and desire to secure by Letters Patent, is—

The levers E arranged above a stall, for operating the stanchions, and locked by their own weight in the notched or grooved timber for locking the stanchions, as set forth.

JOHN D. SCOTT.

Witnesses:
    H. H. WINCHELL,
    W. M. WILLIAMSON.